United States Patent

[11] 3,574,478

| [72] | Inventors | Michael Toth, Jr.<br>Fallsington, Pa.;<br>Richard M. Salzmann, Trenton, N.J. |
|---|---|---|
| [21] | Appl. No. | 769,045 |
| [22] | Filed | Oct. 21, 1968 |
| [45] | Patented | Apr. 13, 1971 |
| [73] | Assignee | De Laval Turbine Inc.<br>Trenton, N.J. |

[54] SEALING SYSTEM FOR TURBINE AND COMPRESSOR BEARINGS
5 Claims, 4 Drawing Figs.

[52] U.S. Cl. .................................................. 415/112, 415/170
[51] Int. Cl. .................................................. F04d 29/00, F04d 29/08
[50] Field of Search .................................................. 230/132, 116; 103/111; 253/39.1, 39.15, 39; 415/112

[56] References Cited
UNITED STATES PATENTS

| 1,474,454 | 11/1923 | Telfer | 103/111 |
| 1,737,870 | 12/1929 | Telfer | 103/111 |
| 2,428,830 | 10/1947 | Birmann | 253/39.15 |
| 2,805,819 | 9/1957 | Buchi, Sr. et al. | 230/116 |

Primary Examiner—Henry F. Raduazo
Attorney—Busser, Smith & Harding

ABSTRACT: In turbines and compressors, leakage of oil from a bearing chamber into gas passages and leakage of gas into the bearing chamber is prevented by evacuating the bearing chamber to draw a stream of air in one direction past a labyrinthine packing toward the bearing chamber, while drawing a stream of air from the same source past a second labyrinthine packing toward the gas passage by taking advantage of the vacuum-producing effect of the flow of gas.

INVENTORS
MICHAEL TOTH, Jr. &
RICHARD M. SALZMANN

BY
ATTORNEYS

INVENTORS
MICHAEL TOTH, Jr. &
RICHARD M. SALZMANN
BY
ATTORNEYS

INVENTORS
MICHAEL TOTH, Jr. &
RICHARD M. SALZMANN

BY
ATTORNEYS 3,574,478

SEALING SYSTEM FOR TURBINE AND COMPRESSOR BEARINGS

BACKGROUND OF THE INVENTION

This invention relates to sealing systems, and particularly to systems for use in turbomachinery for preventing the leakage of oil from bearing chambers into the blading area and gas passages.

In turbines having rotor bearings located adjacent the outlet edges of the blades, there exists the problem of leakage of oil from the bearing chamber past the packing and into the gas passages of the turbine. Accompanying this problem are the problems of preventing hot turbine exhaust gases from entering the bearing chamber and of shielding the bearings from the heat of the turbine exhaust.

A related problem exists in centrifugal compressors having shaft bearings located in positions such that lubricating oil is liable to seep past a packing under the influence of the vacuum created at the compressor inlet.

In the past, attempts have been made to prevent oil leakage from bearing chambers by forcing air under a greater than atmospheric pressure past the shaft packing into the bearing chamber. The flow of air past the packing prevents oil leakage, but it is difficult to produce satisfactory flow since the greater pressure drop between the air pump and the gas passage of the turbine or compressor creates an unbalanced situation in which most of the air flows into gas passage rather than into the bearing chamber.

SUMMARY OF THE INVENTION

In accordance with this invention, the flow of oil past bearing chamber packings is prevented by providing an educator which draws a vacuum on the bearing chamber to produce a flow of atmospheric air past the packing in a direction opposite to the direction of oil leakage. In the case of a turbine, the inlet for atmospheric air is located between a pair of packings, one being the packing through which air is drawn into the bearing chamber. A stream of air from the same source is drawn past the other packing by the action of the gases leaving the turbine wheel. This not only prevents the flow of hot turbine exhaust gases into the bearing chamber, but also effects a colling of the turbine exhaust.

In the case of the compressor, a similar pair of packing elements are used, air being drawn past the first by the vacuum in the bearing chamber to prevent oil leakage, and air being drawn past the second packing element by the vacuum created at the compressor inlet.

In accordance with the invention, air is drawn from the atmosphere or from a separate air supply into the bearing chamber and into the gas passages of the turbine or compressor under the influence of two separate and opposing sources of vacuum. The unbalanced situation is thereby avoided, and a substantial flow of air into the bearing chamber is produced.

DESCRIPTION OF THE PREFERRED EMBODIMENT

Figure 1:
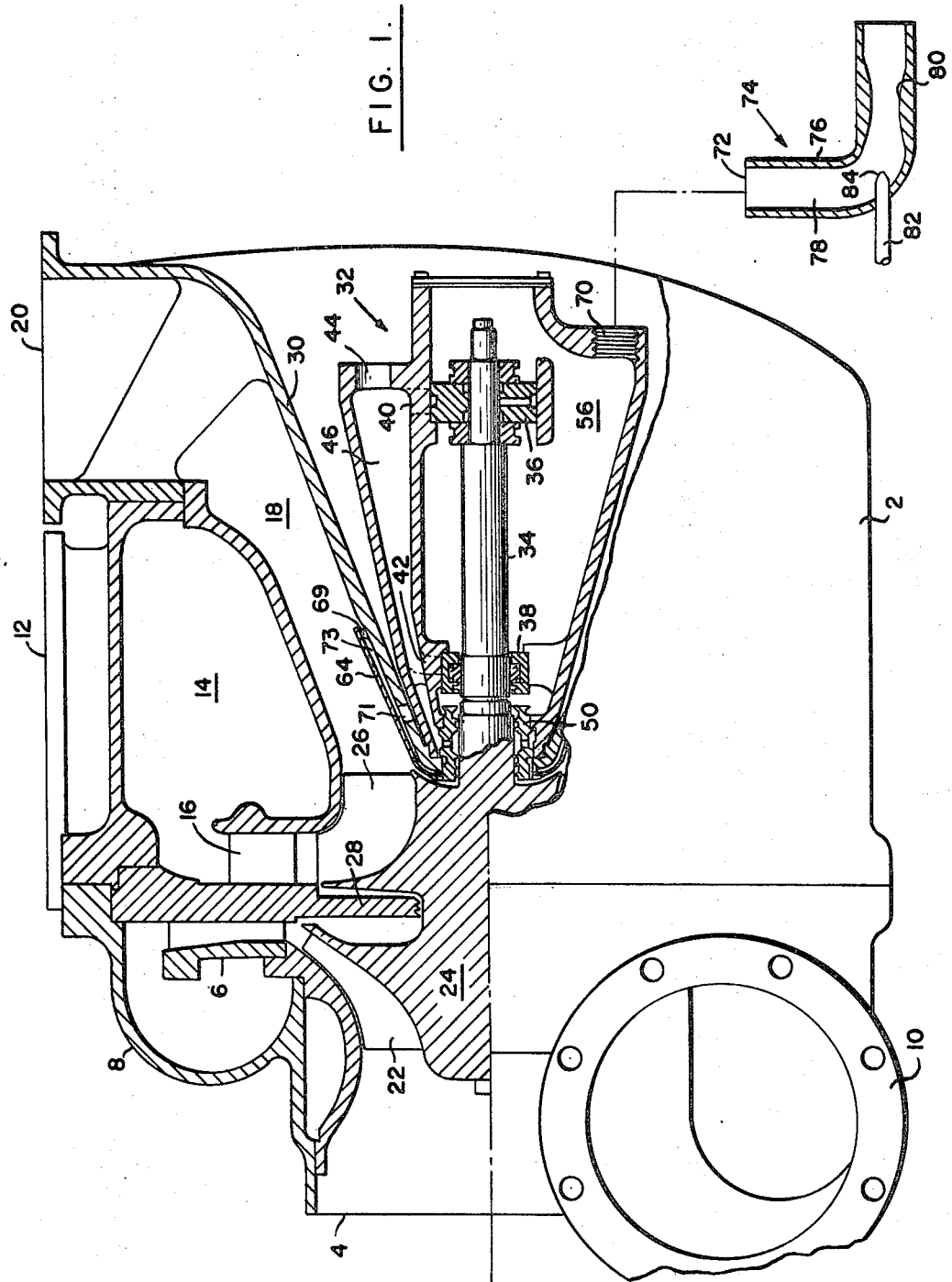
FIG. 1 is a side elevation of a turbocharger in accordance with the invention having a rotor bearing on the turbine side, the upper part of the figure being in axial section.

Referring to FIG. 1, there is illustrated a turbocharger having a housing 2 on which there is provided a compressor inlet 4, a diffuser 6, and a volute 8 leading to the compressor outlet 10. A turbine inlet is indicated at 12. The turbine inlet communicates with a passage 14 from which driving gases flow through nozzles defined by inlet guide vanes 16 (which may be adjustable) to the turbine blading. From the outlet of the turbine blading, the gas is conducted through an outlet passage 18 to the turbine outlet 20.

Mixed flow impeller blading is indicated at 22, and is mounted on a hub 24. Radial inflow, axial discharge centripetal turbine blading is mounted on hub 24, and is indicated at 26. Partition 28 separates the compressor and turbine sections of the turbocharger, and provides support for the diffuser and the turbine inlet guide vanes.

Within the space defined by the conical wall 30 of the turbine outlet passage, a bearing housing indicated generally at 32 is supported from the turbocharger housing by suitable bracket members (not shown). Shaft 34, which is an integral part of hub 24, is journaled in an end bearing 36, and also in bearing 38, which is desirably of the tilting shoe type. Passages 40 and 42 deliver lubricating oil respectively from a lubricating oil supply chamber (not shown because it is behind the plane in which the section is taken) to bearings 36 and 38.

Figure 3:
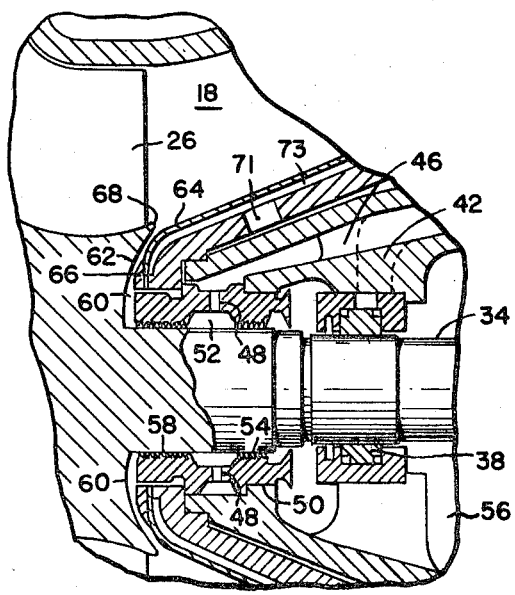
FIG. 3 is an axial section showing in detail the packing in the turbocharger of FIG. 1.

An opening 44 permits the entrance of air from the atmosphere into air chamber 46. In FIGS. 1 and 3, air chamber 46 is in front of, and separated from the lubricating oil chamber.

Referring to FIG. 3, air is conducted from chamber 46 through radial openings 48 in packing 50. Packing 50, although it is a unitary element, comprises a pair of axially spaced packing members which are separated by a central groove 52 adjacent the rotor shaft 34, from which air can be conducted past packing rings 54 into space 56, and past packing rings 58 into a passage 60, which is defined by the right hand of 62 of the rotor hub and the left-hand side of packing 50, heat shield 64 and heat shield clamping ring 66. Passage 60 leads past lip 68 of the rotor hub into the turbine exhaust passage 18.

The outer end of heat shield 64 rests on spacers 69 formed in the wall 30 of the exhaust casing. A plurality of openings are provided for the flow of air from the atmosphere through wall 30 into the space 73 between the exhaust casing and the heat shield. One such opening is indicated at 71.

Again referring to FIG. 1, bearing space 56 is provided with a threaded outlet 70, which communicates with the inlet 72 of an eductor 74. The eductor can be any device which produces a vacuum. The eductor shown comprises a tube 76 having an internal passage 78 bent at a right angle. The outlet portion 80 of the passage is a venturi. A tube 82 conducts a fluid under pressure through the wall of the eductor to a nozzle 84, which directs the fluid through the venturi toward the outlet of the eductor. Air and oil are typical fluids which may be forced through tube 82 and through nozzle 84, and if oil is used, it can be recirculated through the lubricating system.

The action of the eductor results in a pressure drop in bearing space 56. This causes air to flow from passage 46 through openings 48, and from the annular space 52 past the packing rings 54 in a direction toward the bearing space. This flow of air entrains any lubricating oil which might tend to leak from the bearing chamber between rings 54 and the rotor shaft 34.

The lip 68 on the right-hand side of the turbine hub extends in a radial direction outwardly with respect to the innermost portion of the turbine blading. Lip 68 also extends toward the right so that the right-hand end 62 of the hub is curved toward the direction of turbine exhaust flow. As the turbine exhaust gas stream leaves the blading 26 and passes lip 68, a vacuum is induced at the opening of passage 60 to the exhaust passage 18, causing air from passage 46 to flow along the rotor shaft past packing rings 58 and outwardly through passage 60 to the turbine exhaust passage 18. The lip directs the exhaust gas stream tangentially along heat shield 64, and prevents the exhaust gas from impinging upon the stationary parts.

The flow of air through passage 60 prevents the flow of turbine exhaust gas into the bearing space. It also has an effect in cooling the turbine exhaust casing. Additional cooling of the exhaust casing is provided by the continuous flow of cool air from the atmosphere through passages 71 into the space 73 between the heat shield and the exhaust casing. This continuous flow of cool air is caused by the vacuum-producing action of the turbine exhaust gases at the outer edge of the heat shield, which causes the air in space 73 to flow through the openings between spacers 69 into the exhaust gas stream.

Figure 2:
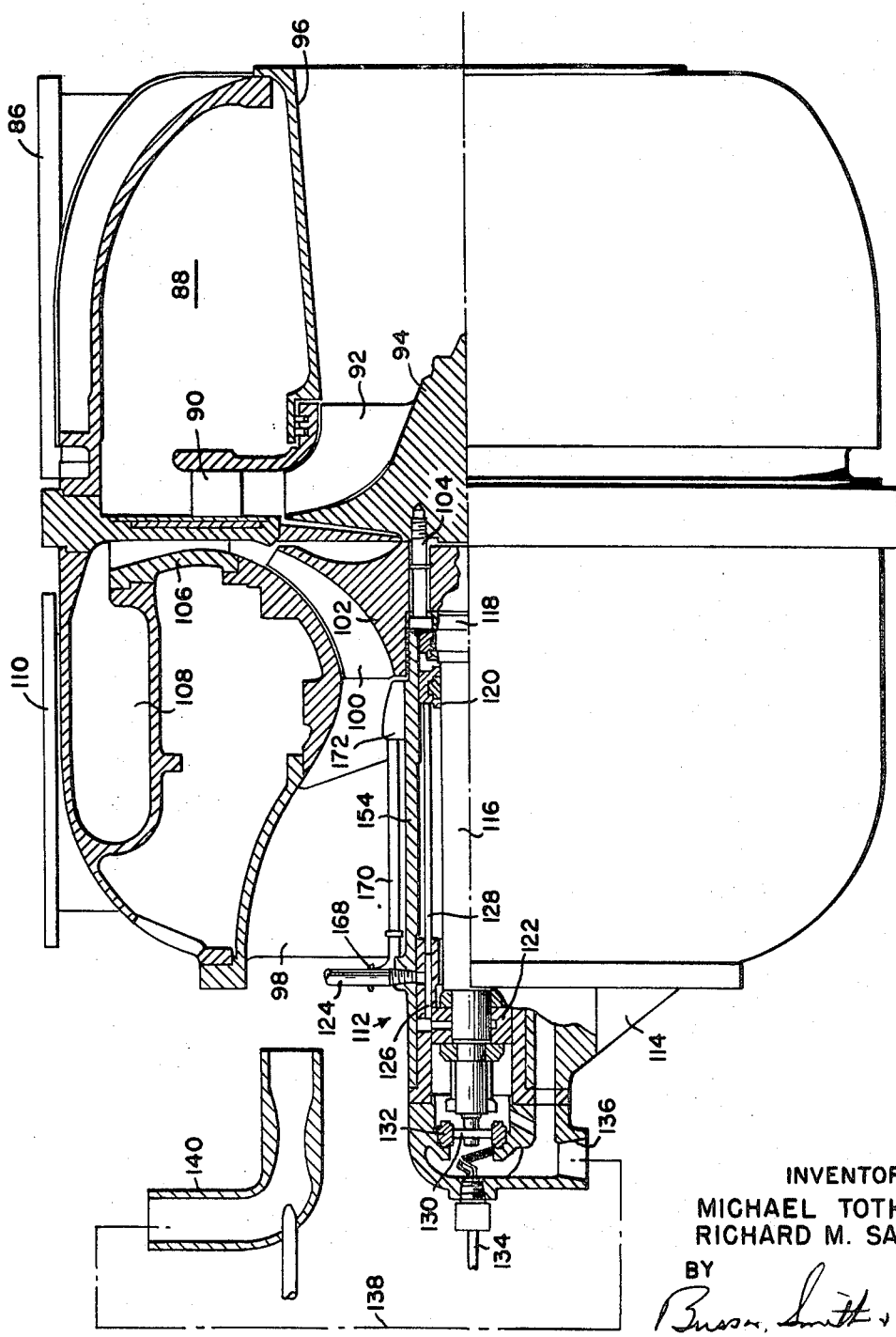
FIG. 2 is a side elevation of a turbocharger having bearings on the compressor side, the upper part of the figure being in axial section.
Figure 4:
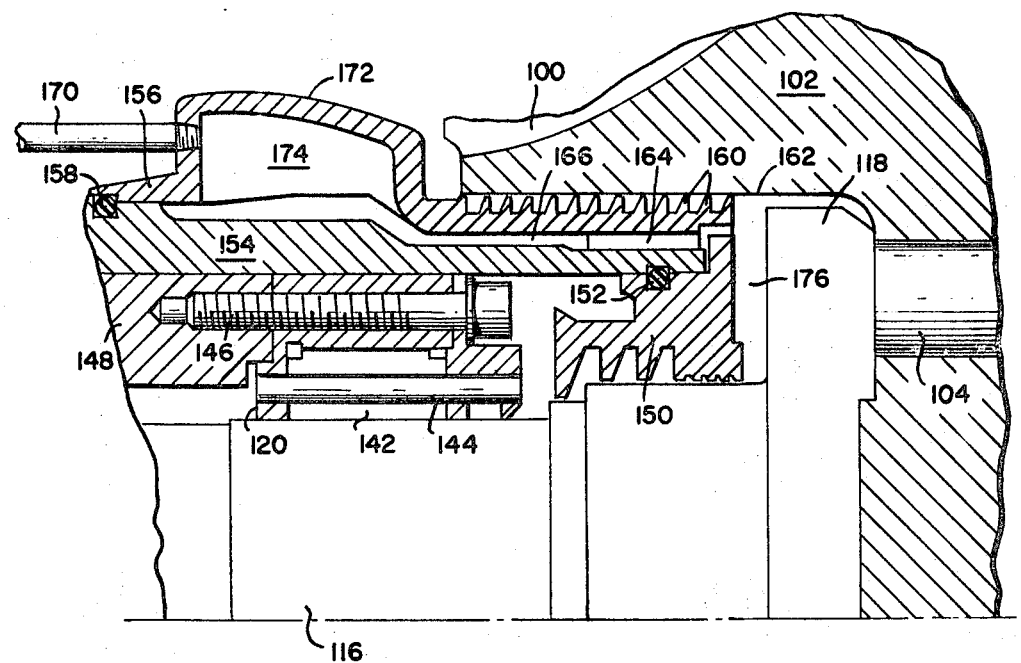
FIG. 4 is an axial section showing in detail the packing of the shaft of the turbocharger shown in FIG. 2.

FIGS. 2 and 4 show a turbocharger having an overhung rotor, in which the bearings are on the compressor side.

A turbine inlet is indicated at 86, from which gases are conducted through passage 88, and past guide vanes 90 to turbine blading 92 on hub 94. After leaving the turbine blading, the exhaust passes through exhaust cone 96.

A compressor inlet passage 98 leads to the inlet edges of compressor blades 100, which are mounted on hub 102. Hub 102 is secured to the turbine hub 94 by bolts, one of which is indicated at 104. A diffuser 106 conducts the compressed gases into volute 108, from which they are delivered to the compressor outlet 110.

Compressor inlet passage 98 surrounds a bearing housing 112, which is supported from the compressor housing by brackets, one of which is indicated at 114. Shaft 116, which is provided with a flange 118 at its inner end supports both of hubs 102 and 94 through bolts 104. An inner bearing is provided at 120, and an outer bearing at 122. Lubricating oil is delivered to both bearings from pipe 124, an oil passage being provided at 126 for the delivery of oil to bearing 122, and a tube 128 being provided to deliver oil to bearing 120.

At the outer end of shaft 116 there is provided a tachometer rotor 130, which generates a current in coil 132. The current is conducted to a measuring instrument through cable 134. Outlet passage 136 leads from the interior of the bearing chamber through suitable piping indicated at 138 to an eductor 140, which is similar to that shown in FIG. 1.

The details of bearing 120 and the packing which separates the interior of the bearing chamber from the compressor inlet appear in FIG. 4. Bearing 120 is a tilting shoe bearing having shoes 142, which are separated from each other by pins 144. Bolts 146 fasten the housing for the tilting shoe bearing to member 148, which is fixed to the housing of the bearing chamber.

An inner labyrinthine packing member 150 surrounds shaft 116. Member 150 is sealed to the housing of the bearing chamber by O-ring 152, which fits in aligned grooves in packing member 150 and in member 154 of the housing of the bearing chamber. Member 154 is sealed to an outer packing member 156 by O-ring 158.

Outer packing member 156 is provided with packing rings 160, which cooperate with a cylindrical surface 162 of the compressor hub 102. Underneath rings 160, there are provided spacers 164, which separate packing member 156 from the bearing chamber housing 154 to provide a space 166.

Referring to FIGS. 1 and 4, air is delivered from the atmosphere through opening 168 into pipe 170, through which it is conducted through fitting 172, and through an opening 174 into space 166. Space 166 communicates with space 176, from which air is conducted past packing rings 160 to the compressor inlet, and past the rings of packing member 150 to the interior of the bearing chamber.

In the operation of the turbocharger shown in FIGS. 2 and 4, the vacuum created within bearing enclosure 154 by the action of eductor 140 causes atmospheric air within space 176 to flow between packing 150 and the shaft into the bearing chamber. This flow of air prevents the leakage of lubricating oil into space 176, and from there into the compressor inlet. The vacuum caused by the action of the compressor blading in drawing air through inlet 98 causes air to flow also from space 176 past packing rings 160. This latter stream of air combines with the air entering inlet 98, and is pumped by the compressor blading.

Because of the drawing of air into the bearing chamber, the very high vacuum conditions at the compressor inlet cannot cause lubricating oil to flow from the bearing housing into the compressor inlet, as would be the case if an ordinary single packing member were used.

The invention, which has been described with reference to combination turbines and compressors can be applied with the same beneficial results to turbines and compressors individually. Its use is not limited to machines having overhung rotors, and it may be applied to seal-bearing housings on both sides of a rotor. The invention may also be applied to turbochargers in which the compressor wheel inlet faces the turbine wheel exhaust. In any of these cases, the sealing will be superior to that obtained through the use of a sealing system operating on compressed air because the vacuum in the bearing chamber insures a substantial flow of sealing air into the bearing chamber, and the flow sealing air is relatively independent of flow conditions in the gas passages of the turbine or compressor.

We claim:

1. A device for handling elastic fluid having passages for said fluid and comprising a housing, a rotor within the housing having a hub carrying blading defining at least portions of said passages, means providing a sealed bearing chamber, bearing means within said chamber for rotatably mounting said rotor, packing means for sealing said bearing chamber from said passages including first and second packing members with a space between them, means providing for flow of air into said space, said first packing member being located between said space and said passages and providing clearance for the flow of air from said space into said passages under the influence of a vacuum created by the flow of elastic fluid through said passages, said second packing member being located between said space and said sealed bearing chamber and providing clearance for the flow of air from said space into said bearing chamber, and means for evacuating said sealed bearing chamber to draw air from said space into said sealed bearing chamber past said second packing member whereby flow from the bearing chamber is precluded from taking place past said packing means into the fluid-handling passages of said device.

2. A device according to claim 1 in which said blading is axial inflow compressor blading, and in which said first packing means is located between said space and the compressor inlet.

3. An elastic fluid-handling device according to claim 1 in which said bearing means includes at least two axially separated bearings within said bearing chamber, said bearings providing the sole support for said rotor.

4. An elastic fluid turbine having passages for said fluid and comprising a housing, a rotor within said housing having a hub carrying radial inflow turbine blading defining at least portions of said passages, means providing a bearing chamber located on the exhaust side of said rotor, bearing means within said chamber for rotatably mounting said rotor, packing means for sealing said bearing chamber from said passages including first and second packing members with a space between them, means providing for flow of air into said space, said first packing member being located between said space and said passages and providing clearance for the flow of air from said space into the turbine exhaust under the influence of the flow of exhaust gas leaving said blading, said second packing member being located between said space and said bearing chamber and providing clearance for the flow of air from said space into the bearing chamber, and means for evacuating said bearing chamber to draw air from said space into said bearing chamber past said second packing member.

5. An elastic fluid turbine according to claim 4 in which said hub includes lip means located at the outlet end of said blading for directing exhaust gases leaving said blading in a direction having a radial outward component.